United States Patent
Zhu et al.

(10) Patent No.: US 11,002,921 B2
(45) Date of Patent: May 11, 2021

(54) OPTICAL FIBER CONNECTING DEVICE WITH A DUST-PROOF SLEEVE

(71) Applicant: Amphenol Fiber Optic Technology (Shenzhen) Co., Ltd., Shenzhen (CN)

(72) Inventors: Ling-Hua Zhu, Shenzhen (CN); Xing-Fu Mo, Shenzhen (CN); Jinan Zhou, Shenzhen (CN); Anh Nguyen, Shenzhen (CN)

(73) Assignee: Amphenol Fiber Optic Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/701,443

(22) Filed: Dec. 3, 2019

(65) Prior Publication Data
US 2021/0003786 A1    Jan. 7, 2021

(30) Foreign Application Priority Data
Jul. 3, 2019   (TW) .................................. 108208630

(51) Int. Cl.
*G02B 6/36* (2006.01)
*G02B 6/38* (2006.01)

(52) U.S. Cl.
CPC ......... *G02B 6/3849* (2013.01); *G02B 6/3624* (2013.01); *G02B 6/3866* (2013.01)

(58) Field of Classification Search
CPC ... G02B 6/3624; G02B 6/3849; G02B 6/3866
See application file for complete search history.

(56) References Cited

U.S. PATENT DOCUMENTS

| | | | | |
|---|---|---|---|---|
| 7,264,402 B2 * | 9/2007 | Theuerkorn | ......... | G02B 6/3851 385/59 |
| 10,185,098 B2 * | 1/2019 | Jiang | ..................... | G02B 6/3825 |
| 10,215,929 B2 * | 2/2019 | Yan | ....................... | G02B 6/3821 |
| 10,481,342 B1 * | 11/2019 | Yang | ..................... | G02B 6/3866 |
| 10,551,571 B2 * | 2/2020 | Liu | ........................ | G02B 6/3825 |
| 2007/0160327 A1 * | 7/2007 | Lewallen | ............. | G02B 6/3885 385/53 |
| 2011/0188813 A1 * | 8/2011 | Marcouiller | ......... | G02B 6/3849 385/78 |
| 2019/0227244 A1 * | 7/2019 | Huang | ................. | G02B 6/3825 |

FOREIGN PATENT DOCUMENTS

| | | | | |
|---|---|---|---|---|
| CN | 210119604 U | * | 2/2020 | ............... G02B 6/38 |
| CN | 210123489 U | * | 3/2020 | ............... G02B 6/38 |
| CN | 210270275 U | * | 4/2020 | ............... G02B 6/38 |
| JP | 2013105048 A | * | 5/2013 | ............... G02B 6/38 |

* cited by examiner

*Primary Examiner* — Daniel Petkovsek
(74) *Attorney, Agent, or Firm* — Michael Best & Friedrich LLP

(57) ABSTRACT

A optical fiber connecting device includes a hollow main body and a dust-proof sleeve. The hollow main body includes a first hollow inserting portion, a second hollow inserting portion oppositely of the first hollow inserting portion, and a flange between the first and second hollow inserting portions. The second hollow inserting portion has an engaging recess. The dust-proof sleeve is removably sleeved around the second hollow inserting portion. The dust-proof sleeve has an inner sleeve surface and a C-shaped rib that projects inwardly from the inner sleeve surface to releasably engage the engaging recess.

6 Claims, 4 Drawing Sheets

OPTICAL FIBER CONNECTING DEVICE WITH A DUST-PROOF SLEEVE

CROSS-REFERENCE TO RELATED APPLICATION

This application claims priority to Taiwanese Patent Application No. 108208630, filed on Jul. 3, 2019.

FIELD

The disclosure relates to an optical fiber connecting device.

BACKGROUND

For multimedia transmission, there is an optical fiber connecting assembly provided in the prior art for use in connecting an optical fiber connector, such as a LC, MPO or SC type connector, with a multimedia cable connector, such as a fan-out connector. The optical fiber connecting assembly is composed of two component parts connected to each other and configured to respectively mate different types of optical fiber connectors.

Because the optical fiber connecting assembly is a two-piece structure, when it is used to connect two different connectors respectively coupled to fiber optic cables, the two component parts of the optical fiber connecting assembly has to be assembled by an operator working for cable installation, thereby requiring additional assembling time. In some applications, the cables are needed for placement in a cable conduit, and the optical fiber connecting assembly has to be inserted into the cable conduit. To avoid dusts from contaminating termination points of the cables, a dust-proof mechanism is additionally needed for assembly with the optical fiber connecting assembly during the pulling of the optical fiber connecting assembly into the cable conduit. Since the dust-proof mechanism is not provided as an essential original part of the optical fiber connecting assembly, it should be added during cable installation, thus adversely affecting the efficiency of cable installation.

SUMMARY

Therefore, an object of the disclosure is to provide an optical fiber connecting device that can alleviate at least one of the drawbacks of the prior art.

According to the disclosure, an optical fiber connecting device includes a hollow main body and a dust-proof unit.

The hollow main body defines an axis and includes a first hollow inserting portion extending around the axis for insertion of a fiber optic connector, a second hollow inserting portion extending around the axis oppositely of the first hollow inserting portion for insertion of another fiber optic connector, and a flange extending around the axis between the first and second hollow inserting portions. The second hollow inserting portion has an outer surface extending around the axis, and an engaging recess indented into the outer surface and extending around the axis.

The dust-proof unit includes a dust-proof sleeve removably sleeved around the second hollow inserting portion. The dust-proof sleeve has an inner sleeve surface, and a C-shaped rib that projects inwardly from the inner sleeve surface to releasably engage the engaging recess for retaining the dust-proof sleeve on the hollow main body.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
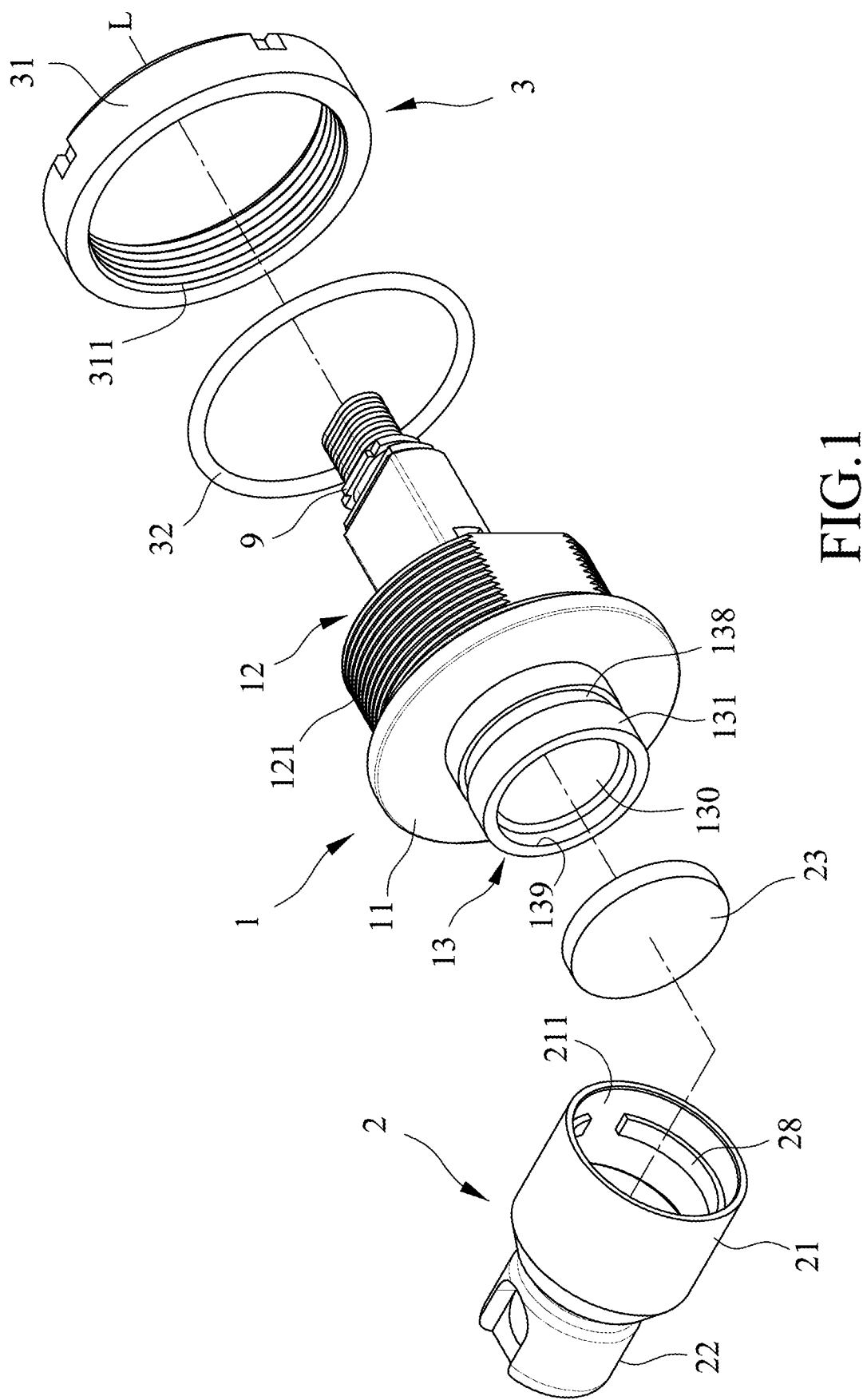
FIG. 1 is an exploded perspective view illustrating an embodiment of an optical fiber connecting device according to the disclosure.
Figure 2:
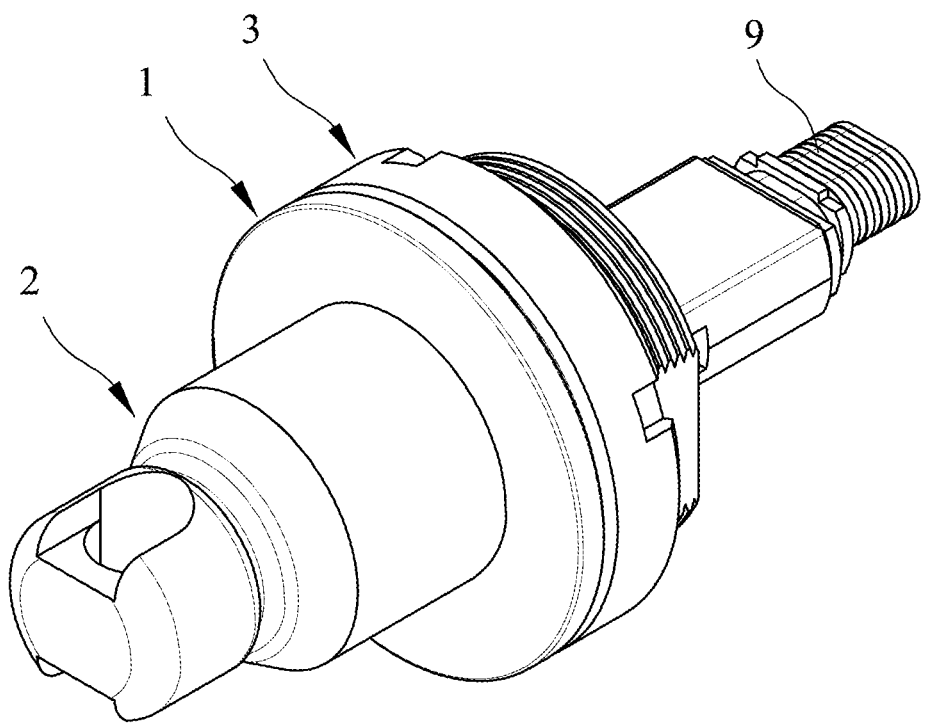
FIG. 2 is a perspective view of the embodiment.

FIGS. 1 and 2 illustrate an embodiment of an optical fiber connecting device according to the disclosure for coupling a fiber optic connector 9. The optical fiber connecting device includes a hollow main body 1, a dust-proof unit 2 and an outer sleeve unit 3. In this embodiment, the fiber optic connector 9 is an MPO connector.

The hollow main body defines an axis (L) and includes a first hollow inserting portion 12 extending around the axis (L) for insertion of the fiber optic connector 9, a second hollow inserting portion 13 extending around the axis (L) oppositely of the first hollow inserting portion 12, and a flange 11 extending around the axis (L) between the first and second hollow inserting portions 12, 13. The first hollow inserting portion 12 has an outer threaded surface 121. The second hollow inserting portion 13 has an outer surface 131 extending around the axis (L), and an engaging recess 138 indented into the outer surface 131 and extending around the axis (L). In addition, the second hollow inserting portion 13 surrounds an inner space 130 that has an open end 139, and is configured for insertion of another fiber optic connector (e.g. a fan-out connector).

The dust-proof unit 2 includes a dust-proof sleeve 21 removably sleeved around the second hollow inserting portion 13, and a dust cover 23 disposed within the dust-proof sleeve 21 and sealing the open end 139. The dust-proof sleeve 21 has an end distal from the hollow main body 1 and formed with a pull ring 22, an inner sleeve surface 211, and a C-shaped rib 28 that projects inwardly from the inner sleeve surface 211 to releasably engage the engaging recess 138 for retaining the dust-proof sleeve 21 on the second hollow inserting portion 13 of the hollow main body 1. By virtue of a releasable engagement between the rib 28 and the engaging recess 138, it is easy to connect the dust-proof sleeve 21 to the second hollow inserting portion 13 of the hollow main body 1 for dust prevention. To further prevent dusts from entering the inner space 130 of the second hollow inserting portion 13, the dust cover 23 is made from a resilient material, and abuts the open end 139 when the dust-proof sleeve 21 is sleeved around the second hollow inserting portion 13.

Figure 3:
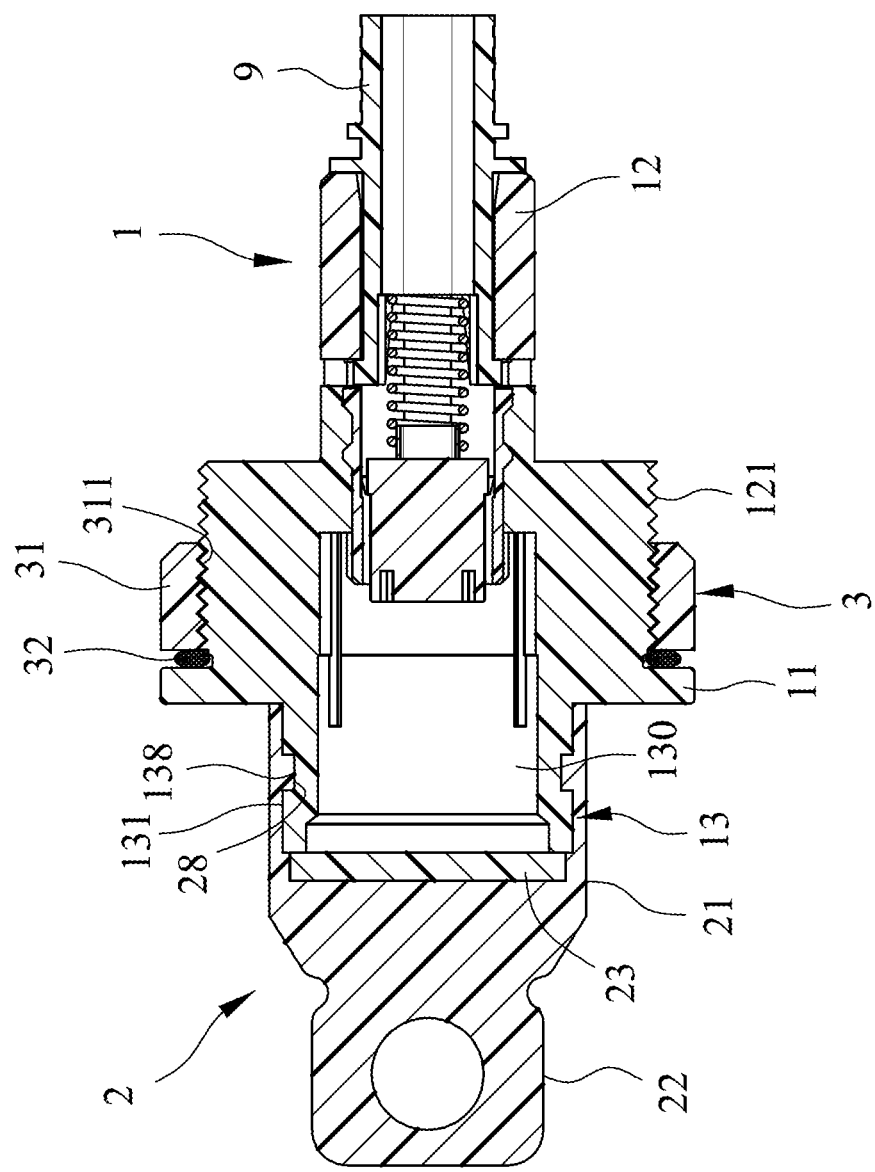
FIG. 3 is a sectional view of the embodiment.

Referring to FIG. 3, in combination with FIGS. 1 and 2, the outer sleeve unit 3 includes an outer sleeve 31 and seal ring 32. The outer sleeve 31 is disposed around the first hollow inserting portion 12 of the hollow main body 1, and has an inner threaded surface 311 threadedly engaged with the outer threaded surface 121 of the first hollow inserting portion 12. The seal ring 32 is sleeved around the first hollow inserting portion 12 and abuts between the flange 11 and the outer sleeve 31.

In this embodiment, the hollow main body 1 is a one-piece structure. It is unnecessary to assemble the first hollow inserting portion 12, which is configured to mate the fiber optic connector 9, with the second hollow inserting portion 13, which is configured to mate another fiber optic connector. Therefore, the optical fiber connecting device of the disclosure may save the time for assembling two component parts that are needed in the prior art.

Figure 4:
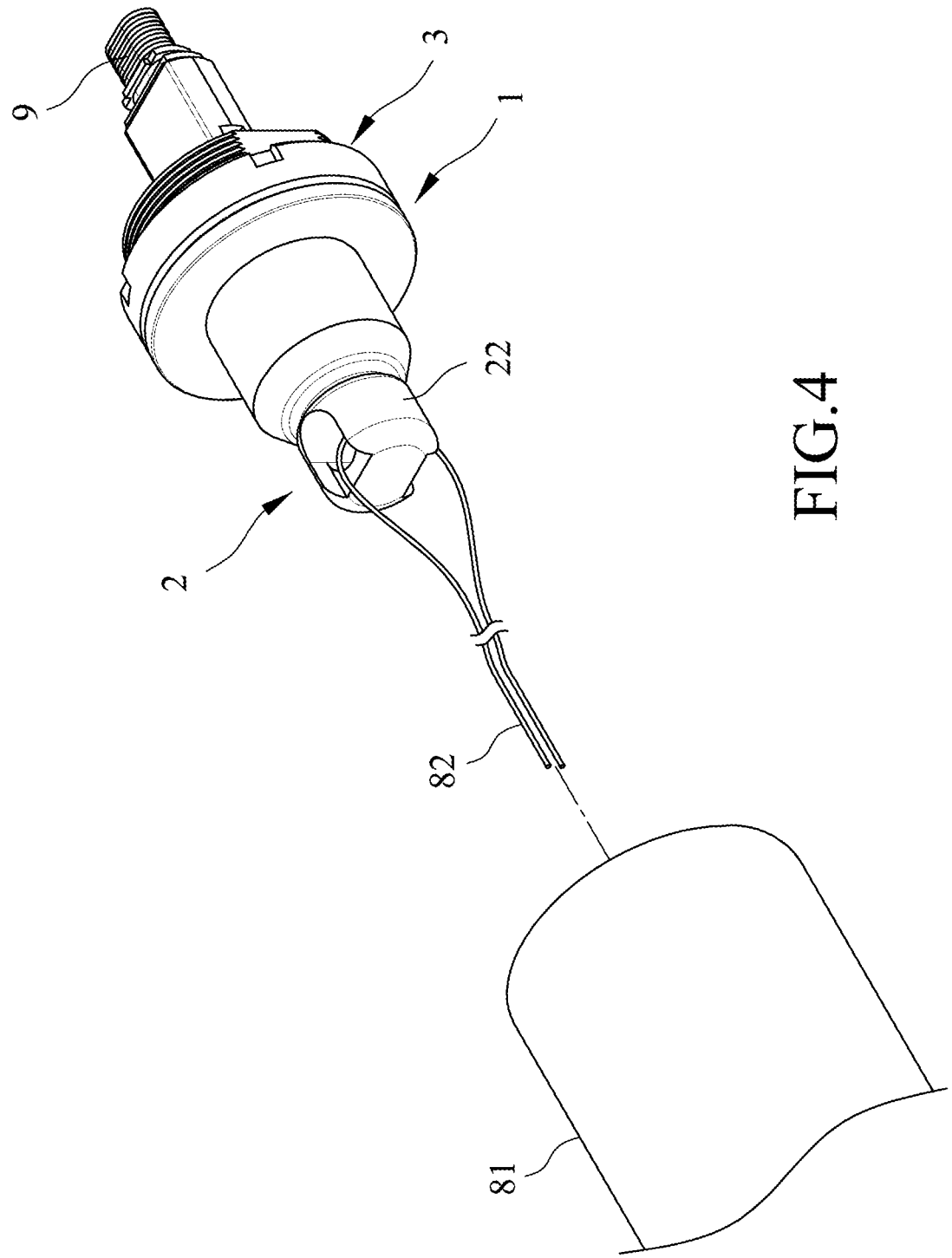
FIG. 4 is a fragmentary perspective view illustrating the optical fiber connecting device connected with a pulling string.

As shown in FIGS. 3 and 4, to insert the optical fiber connecting device into a cable conduit 81, the pull ring 22 of the dust-proof sleeve 21 sleeved on the hollow main body 1 is connected to a pulling string 82. Pulling the pulling string 82 can bring the optical fiber connecting device rapidly into the cable conduit 81. During insertion of the optical fiber connecting device, the dust-proof unit 2 prevents dusts from entering the inner space 130 of the second hollow inserting portion 13, thereby avoiding contamination of cable contact points.

Because the hollow main body is a one-piece structure, in comparison with the prior art that is composed of two component parts, the optical fiber connecting device of the disclosure may save the time for assembly. By virtue of releasable engagement of the rib 28 of the sleeve 21 and the engaging recess 138 of the second hollow insertion portion 13, the dust-proof sleeve 21 can be rapidly assembled to the second hollow insertion portion 13 to avoid dust contamination and at the same time to facilitate the task of pulling the cable into the cable conduit for cable installation.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An optical fiber connecting device comprising:
   a hollow main body defining an axis and including a first hollow inserting portion extending around said axis for insertion of a fiber optic connector, a second hollow inserting portion extending around said axis oppositely of said first hollow inserting portion for insertion of another fiber optic connector, and a flange extending around said axis between said first and second hollow inserting portions, said second hollow inserting portion having an outer surface extending around said axis, and a ring-shaped engaging recess indented into said outer surface and extending around said axis;
   a dust-proof unit including a dust-proof sleeve removably sleeved around said second hollow inserting portion, said dust-proof sleeve having an inner sleeve surface, and a C-shaped rib that projects inwardly from said inner sleeve surface to releasably engage said engaging recess for retaining said dust-proof unit on said hollow main body;
   wherein said second hollow inserting portion surrounds an inner space that has an open end, said second hollow inserting portion further having an endmost face extending around said axis at said open end of said inner space;
   wherein said dust-proof unit further includes a dust cover that is formed as a plate made of a resilient material and that spans and abuts said endmost face of said second hollow inserting portion; and
   wherein said dust-proof sleeve further has a cap portion that extends outwardly from said C-shaped rib of said dust-proof sleeve and said endmost face of said second hollow inserting portion, said cap portion of said dust-proof sleeve having an inner surface defining a receiving space proximate to said endmost face of said second hollow inserting portion, said dust cover being received in said receiving space, and said inner surface of said cap portion pressing a periphery of said dust cover against said endmost face of said second hollow inserting portion so as to seal said inner space of said second hollow inserting portion.

2. The optical fiber connecting device as claimed in claim 1, wherein said dust-proof sleeve further has an end distal from said hollow main body and formed with a pull ring.

3. The optical fiber connecting device as claimed in claim 1, further comprising an outer sleeve disposed around said first hollow inserting portion of said hollow main body, and a seal ring sleeved around said first hollow inserting portion and abutting between said flange and said outer sleeve.

4. The optical fiber connecting device as claimed in claim 3, wherein said first hollow inserting portion has an outer threaded surface, said outer sleeve having an inner threaded surface threadedly engaged with said outer threaded surface of said first hollow inserting portion.

5. The optical fiber connector device of claim 1, wherein said inner surface of said cap portion of said dust-proof sleeve is stepped in close proximity to said endmost face of said second hollow inserting portion to define a shoulder face, said receiving space of said cap portion having a first receiving region that adjoins said shoulder face and that receives an end of said second hollow inserting portion having said endmost face, and a second receiving region that adjoins said shoulder face and that is smaller in cross section than said first receiving region, said dust cover being snugly received in said second receiving region, both of said shoulder face and said dust cover abutting said endmost face.

6. The optical fiber connector device as claimed in claim 5, wherein said dust-proof sleeve further has a rear end face that is opposite to said cap portion and that abuts against said flange.

* * * * *